Sept. 20, 1966  R. O. HULL, JR  3,273,802
APPARATUS FOR CORROSION TESTING
Filed May 26, 1964  3 Sheets-Sheet 1

INVENTOR.
RICHARD O. HULL, JR.
BY
McCoy, Greene, Medish & TeGrtenhus
ATTORNEYS

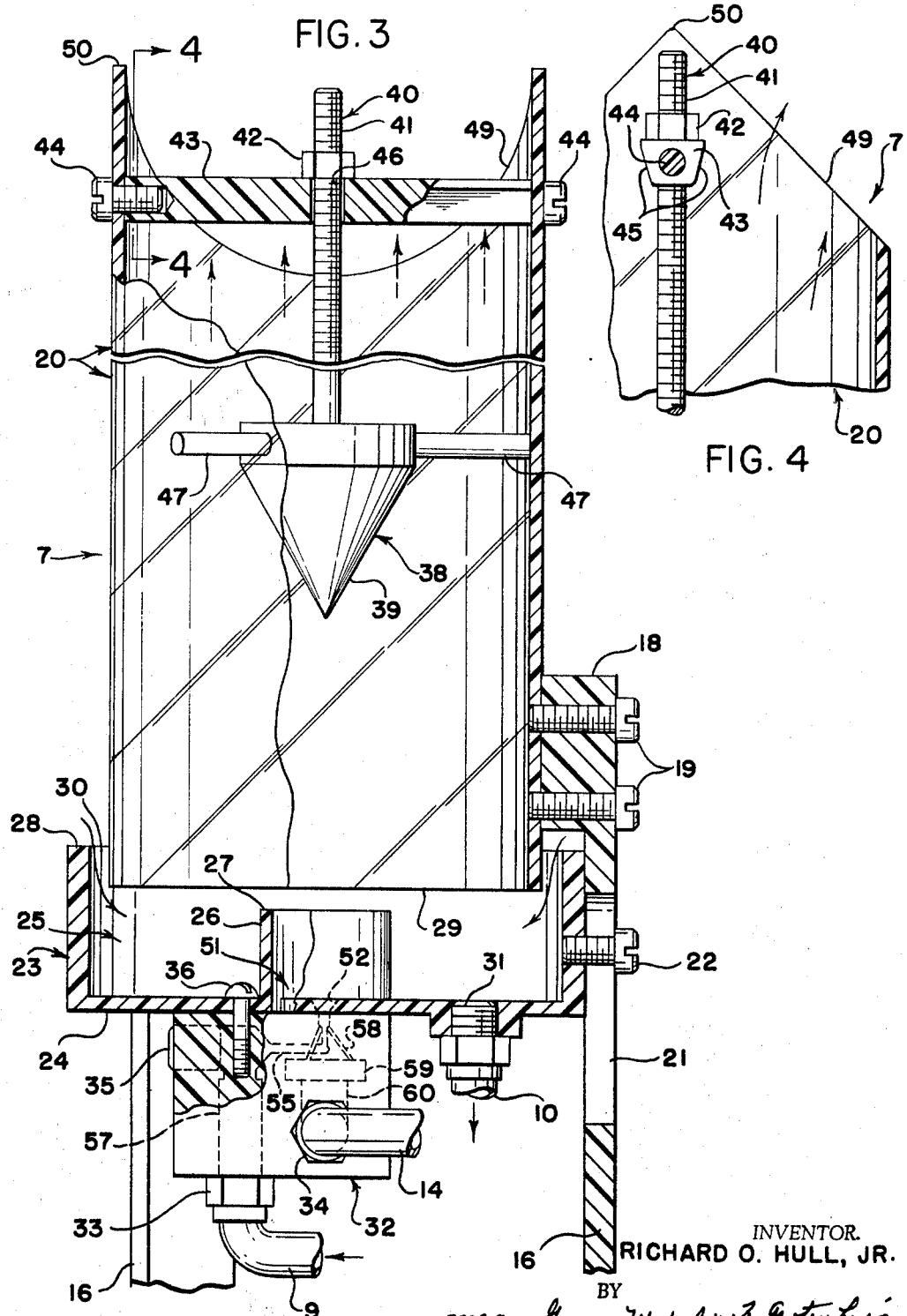

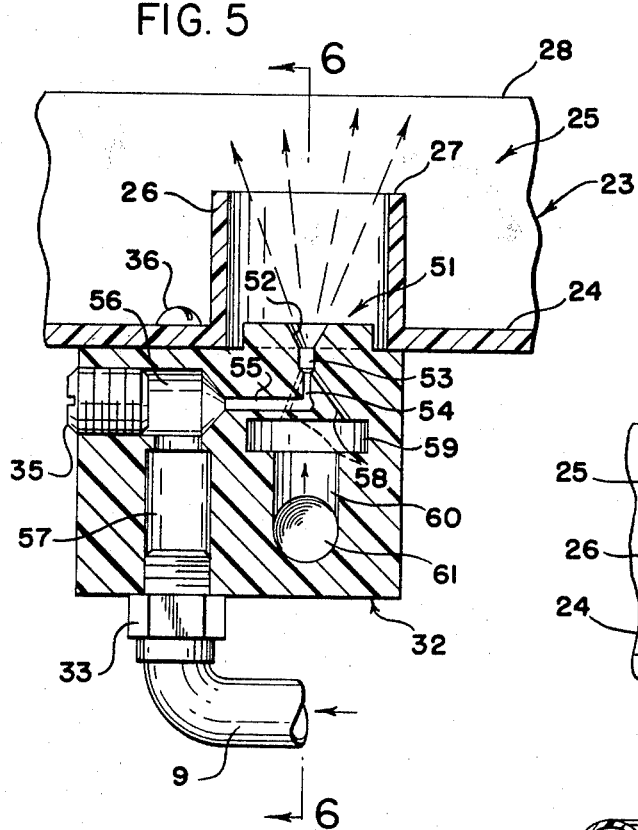
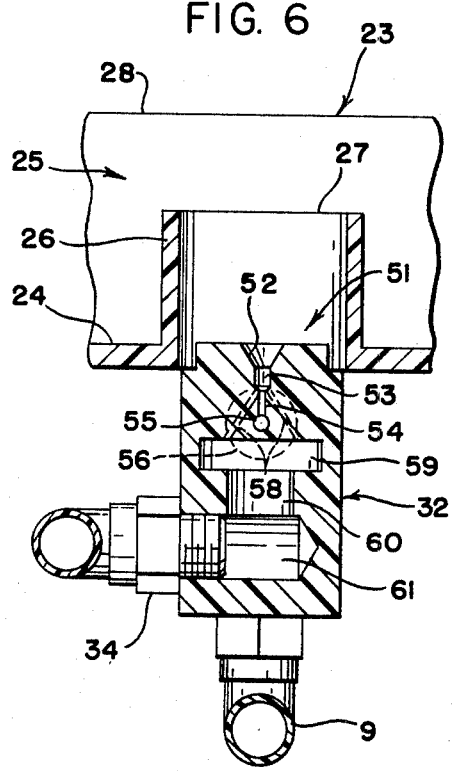
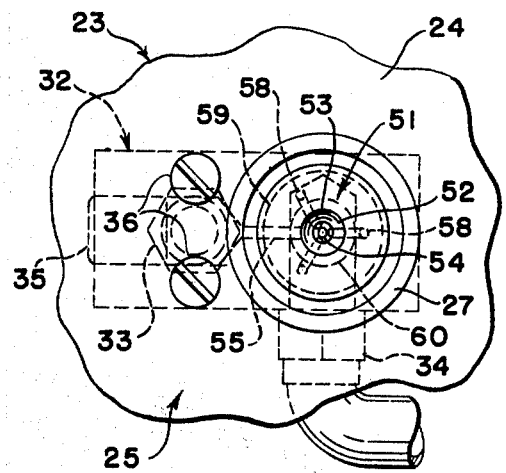

United States Patent Office 3,273,802
Patented Sept. 20, 1966

3,273,802
APPARATUS FOR CORROSION TESTING
Richard O. Hull, Jr., Bay Village, Ohio, assignor, by mesne assignments, to The G S Equipment Company, Cleveland, Ohio, a corporation of Ohio
Filed May 26, 1964, Ser. No. 370,153
10 Claims. (Cl. 239—338)

The present invention relates to apparatus for corrosion testing and more particularly to an improved device for providing the mist within such apparatus having generally conical central deflecting means positioned in a vertically disposed cylindrical tube and an adjustable trap providing an annular air opening at the bottom of the tube.

Heretofore, it has been difficult to maintain proper conditions for accelerated corrosion-resistance tests, such as salt spray tests, because there was no dependable means for producing uniform test conditions and uniform distribution of the corrosive mist throughout the test cabinet.

The mist producing device of the present invention is superior to previously known devices and readily produces a uniformly distributed mist within the testing chamber while preventing the formation of large droplets which cause nonuniform test results. The improved results are obtained by employing an open-ended vertically disposed elongated tube or cylinder having a height several times its diameter, a tapered deflector mounted within the tube intermediate its ends for causing air turbulence in the tube which precludes the formation or causes the breaking up of any large droplets moving upwardly through the tube, a trap adjustable with respect to the lower end of the tube providing an annular air intake opening to said tube, which is effective to control the characteristics of the mist, and an aspirator nozzle mounted on the bottom of the trap for producing and discharging the corrosive mist upwardly axially of the tube toward the tapered deflector. The internal surface of the vertical tube containing the deflector is preferably smooth and unobstructed to provide cylindrical columns of air and mist to the point of engagement with the tapered deflector, and the upper end of the tube is preferably open and free of large obstructions to facilitate uniform outward flow of the corrosive mist into the confines of the test chamber.

The deflector used in the vertical tube of the device is preferably an inverted cone which has a diameter substantially less than the internal diameter of the cylinder and is supported from the top of the tube by an adjustable vertical rod. Such rod may be supported by a narrow transverse bar at the top of the tube which does not interfere substantially with the discharge of the mist from the upper open end of the tube and such bar may have its opposite sides inlined in opposite directions to assist in diverting the mist in a transverse direction. To mitigate any effect of the cross bar to the flow of mist, diametrically opposite upper end portions of the tube are removed to provide arcuate cut away sections through which the flow of mist is diverted as it reaches the upper end of the tube.

Accordingly, it is among the objects of the present invention to provide an improved mist generator which provides optimum conditions within a test chamber for corrosion testing. Another object of the invention is to provide a corrosion testing cabinet with a free settling mist of uniform density which is characterized by being free of any large droplets which tend to adversely effect the uniformity of results obtained on an article disposed in the testing cabinet.

It is still a further oject of the invention to provide a corrosion test cabinet embodying a mist generating device therein which is capable of producing mist which may be varied independently as to volume and size of mist particles.

These and other objects and advantageous features of the invention not at this time more particularly pointed out will become apparent as the nature of the invention is better understood from the following detailed description taken in conjunction with the accompanying drawings wherein like reference characters denote corresponding parts and wherein:

FIGURE 3 is a foreshortened fragmentary elevational view of the mist generating unit with parts broken away and parts shown in vertical cross section;

FIGURE 4 is fragmentary vertical sectional view taken substantially on the line 4—4 of FIGURE 3 and on the same scale;

FIGURE 5 is a fragmentary vertical sectional view showing a portion of the aspirating apparatus;

FIGURE 6 is a vertical sectional view taken on the line 6—6 of FIGURE 5; and

FIGURE 7 is a fragmentary top view of the apparatus shown in FIGURES 5 and 6.

Figure 1:
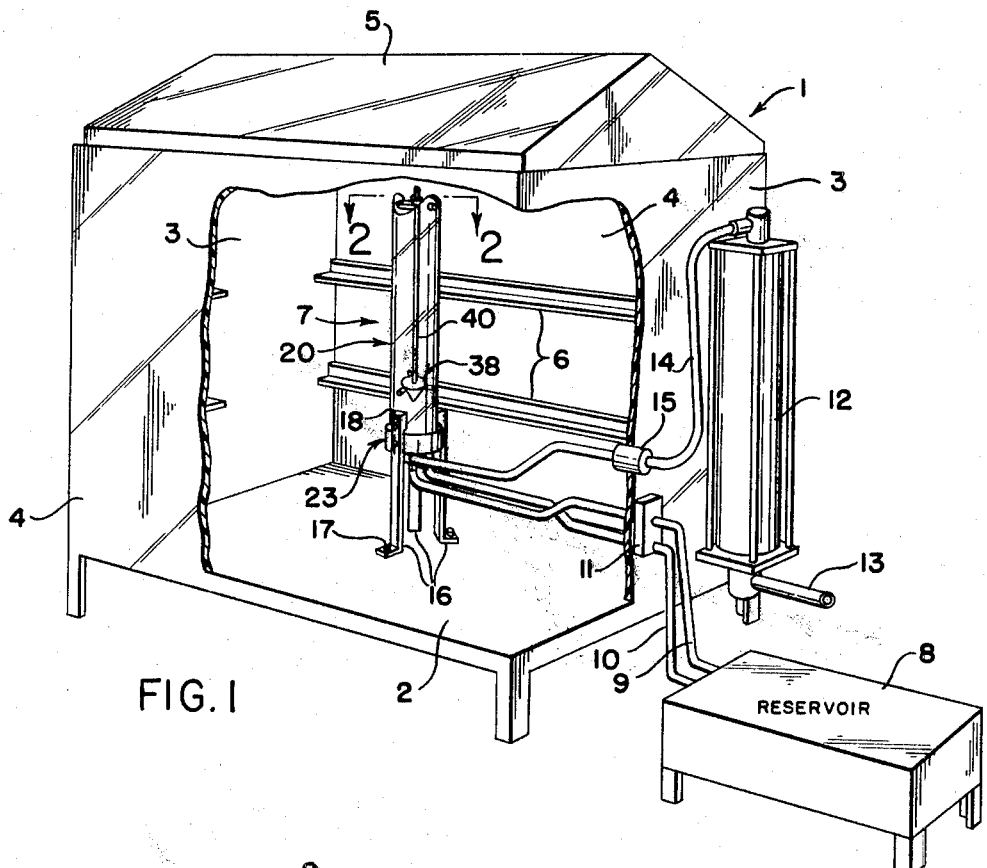
FIGURE 1 is a perspective view with parts broken away and removed showing on a reduced scale a corrosion testing device incorporating the mist generating unit of the present invention.

With reference to the accompanying drawings and particularly FIGURE 1, there is illustrated a preferred form of my corrosion testing device made in accordance with the present invention and comprising a conventional corrosion-resistant testing cabinet 1 having a flat bottom wall 2, opposed end walls 3 and opposed side walls 4 and a removable cover 5. The entire cabinet is preferably formed of a corrosion resistant synthetic resin material such as "Plexiglas," "Lucite," "Tempron," polystyrene, polymethylmethacrylate, or the like. It may also be formed of plain or stainless steel lined with an epoxy resin, hard rubber, or other suitable plastic coating resistant to testing media.

The cabinet 1 contains a mist generating unit broadly indicated by the numeral 7 which receives a corrosion-inducing liquid material from a supply reservoir 8, the liquid being supplied to the device 7 by a supply conduit 9 and being returned to the reservoir through a return conduit 10. A suitable seal 11 is provided to prevent leakage of air or mist where the conduits 9 and 10 pass through one of the end walls 3.

A conventional air saturator 12 is mounted exteriorly of the testing cabinet at one end thereof and receives filtered air through supply conduit 13. Heated air is conducted from the saturator 12 to the unit 7 through supply conduit 14, leakage of air around said conduit at the point it passes through end wall 3 being prevented by the seal 15.

Figure 2:
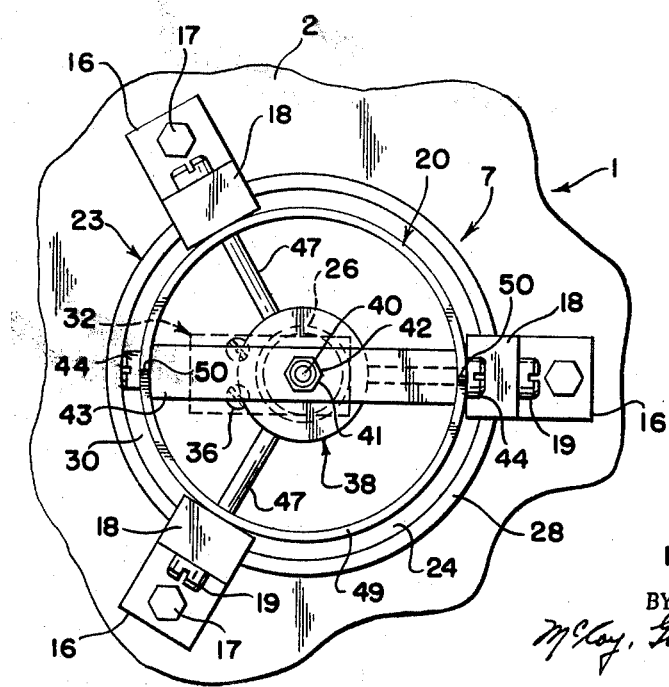
FIGURE 2 is a fragmentary top view of the mist generating unit of this invention taken along the line 2—2 of FIGURE 1.

The cylinder or tube 20 of the unit 7 is preferably supported in a vertical position by three narrow widely spaced supporting legs 16 which do not substantially interfere with the circulation of the mist in the lower regions of the chamber, and such legs may be rigidly connected to the surface of the bottom wall 2 by means of suitable screws or bolts 17. As herein shown (FIGURES 2 and 3) each leg 16 has a thickened upper end portion 18 through which extend spaced screws 19 serving to connect the legs 16 to the lower portion of the elongated cylindrical tube 20. Each leg has a vertically elongated slot 21, which receives an adjusting screw 22 carried by the air control cylinder 23. The screws 22 permit vertical adjustment of the cylinder 23, with respect to the lower end of tube 20, and rigidly supports said cylinder in its adjusted vertical positions coaxial with the tube 20. The cylinder 23 has a flat integrally formed bottom wall 24 perpendicular to the common vertical axis of the tube 20 and the cylinder 23 to provide a cup-shaped liquid-receiving trap 25 having an inner cylindrical wall 26 with a flat upper horizontal end surface 27. The air control cylinder 23 has an upper edge portion 28 disposed substantially parallel to the lower edge portion 29 of the tube 20. An annular opening is thus provided between the lower end of the tube 20 and the upper end of the cylinder 23 for the passage of air into the tube. The size of this opening can be adjusted by raising or lowering the cylinder 23 with respect to the lower end of the tube 20 to control the amount and particle size of the mist produced by the generating unit.

The trap 25 is provided with an outlet connection 31 spaced laterally from the aspirator block 32 to receive the end of the return conduit 10. The block 32 is internally threaded to receive the fitting 33 secured to the end of the supply conduit 9, the fitting 34 secured to the end of the air supply conduit 14 and the removable screw plug 35. The block 32 is rigidly connected to the lower surface of the bottom wall 24 by means of a plurality of screws 36 extending therethrough.

The mist generating unit of the invention is characterized by a novel tapered deflecting member positioned within the confines of the tube 20, a substantial distance above the trap 25. As herein shown, the tube 20 contains a cylindrical deflector 38 having a conical lower portion 39 extending coaxial with the tube. Said deflector is adjustably supported in the tube 20 by means of a support rod 40 of relatively small diameter having a long threaded upper end portion 41 which receives a nut 42. The rod 40 extends through and is carried by a narrow horizontal supporting bar 43 rigidly connected at its opposite ends to diametrically opposed upper portions of the tube 20 by means of screw 44. The opposite side surfaces 45 of the supporting bar are preferably inclined in opposite directions to assist in diverting the mist leaving the upper end of the tube, and the bar may have a smooth central opening 46 rather than a threaded opening when the position of the tube is determined solely by the nut 42.

Because the rod 40 has a length many times the diameter of the tube 20, it is desirable to provide means for centering the deflector 38 in the tube. As herein shown, the deflector 38 is provided with three horizontally extending rods 47 of the same length which terminate at the inner cylindrical surface of the tube 20 and slidably engage the tube surface to axially position the deflector. Each of the rods 47 is rigidly mounted on the deflector to move vertically therewith when the position of the deflector is adjusted.

Means are provided at the upper end of the tube 20 to deflect the mist transversely relative to the vertical axis of the tube as it is discharged therefrom. Such means include two arcuately curved upper surfaces 49 formed in the wall of the tube at diametrically opposite sides of the tapered supporting bar 43, the pointed portions 50 at the top of the tube 20 being located near opposite ends of said supporting bar as shown in FIGURES 3 and 4. The lateral openings provided by cutting away the upper portions of the tube 20 at the surfaces 49 facilitate deflection of the mist as shown by the arrows in FIGURE 4 without causing condensation or providing substantial resistance to upward flow of the mist through the tube 20.

The block 32, which is preferably formed of "Plexiglas" or other corrosion resistant synthetic resin material, has an aspirator nozzle 51 with a conical surface 52 and a cylindrical orifice 53 coaxial with the tube 20 and the cylinder 23. A central vertical passage 54 leads from the orifice 53 to the end of a horizontal bore 55. Said bore leads to the counterbore 56 which is internally threaded to receive the plug 35, and said counterbore communicates with a vertical bore 57 which is internally threaded to receive the connection 33. The corrosive salt solution or other liquid from the supply conduit 9 is thus carried through the bores 57, 56 and 55 to the vertical passage 54 and is discharged through the nozzle 51.

Aspirating means are provided for creating a mist-like dispersion of salt and/or other corrosion inducing material. As herein shown, the block 32 is provided with three regularly spaced inclined air passages 58 of small diameter extending upwardly from an enlarged chamber 59 to the bottom of the orifice 53 at the discharge end of the passage 54. A vertical passage 60 leads from the chamber 59 to the horizontal bore 61 which is internally threaded to receive the connection 34. The saturated air thus flows from the air supply passage 14 through the metering passages 58 to effect aspiration in the conventional manner. The cylindrical wall 26 surrounding the nozzle 51 assists in directing the corrosive mist upwardly in a substantially cylindrical column axially toward the point of the tapered deflector 38 and tends to prevent the air entering between the surfaces 28 and 29 from disturbing the upward flow of the mist adjacent the nozzle.

The apparatus of this invention may be used for salt spray tests similar to those specified under ASTM designation B117–57T or B117–62. Various corrosion-resistant non-metallic materials are suitable for making the test cabinet 1 and the mist generating unit 7 so that they are not damaged by the corrosive action of the salt. In the device shown herein, the legs 16, the generating tube 20, the liquid trap 25, the block 32, the deflector 38, the rod 40, the bar 43, and the rods 47 are preferably made of "Plexiglas" or similar hard plastic material.

The tube 20 has a vertical height many times its internal diameter and preferably 4 to 8 times its internal diameter. The trap 25 has an inner wall 26 with an internal diameter which is preferably 0.2 to 0.4 times the internal diameter of the tube 20 and an outer wall 23 with an internal diameter which is preferably 1.1 to 1.4 times the internal diameter of said tube. The wall 26 preferably extends above the nozzle 51 a distance greater than the internal radius of said wall and less than the internal diameter of said wall 26, and the wall 23 has a height preferably at least equal to that of the wall 26 and usually less than the internal radius of said wall 23.

The legs 16 supporting the tube 20 have a length several times the external diameter of the tube 20 and are narrow and widely spaced. Each leg preferably has a length at least 10 times its width, and the minimum distance between adjacent legs is preferably at least two-thirds the external diameter of the tube 20. The distance from the bottom surfaces of the legs 16 to the bottom of the tube 20 is preferably several times the outside diameter of the tube.

The deflector 38 preferably has an external diameter which is one-third or two-thirds the internal diameter of the tube 20, and the lower conical surface 39 of the deflector preferably has a vertical height equal to one-fourth to two-thirds of the internal diameter of said tube. The deflector is preferably spaced vertically from the nozzle 51 a distance greater than half the internal diameter of the tube 20. The rod 40 supporting the deflector usually has a length at least 20 times its diameter and several times the internal diameter of the tube 20, and the distance from the bar 43 to the deflector 38 is preferably about 0.5 to 0.9 times the height of the tube 20 when the position of the deflector is adjusted.

While best results are obtained using relative dimensions as described above, advantages of the invention can be obtained when the dimensions are varied somewhat. The size of the mist generating unit of this invention will depend on the size of the test cabinet 1. In general, only one mist generating unit is necessary and the overall height of the device is less than 4 feet, but larger devices may be used effectively. In an apparatus of the type shown in the drawings the tube 20 usually has an internal diameter of 3 to 6 inches and a height of 16 to 30 inches and the wall 23 has an internal diameter of about 4 to 7 inches and a height of 1 inch to 3 inches, but such dimensions may also be varied considerably. The tube 20 may, for example, have an internal diameter of 5 inches, a height of 20 to 25 inches, and a thickness less than one-quarter of an inch.

The mist generating unit of this invention functions more effectively than previously known mist generators because of the novel annular air inlet at the bottom of the tube 20 and the novel turbulence producing means disposed inside the tube. The arrangement of the deflector 38 relative to the aspirator nozzle 51 and relative to the air entering the bottom of the tube produces a turbulence in the region of the deflector which produces mist of substantially uniform density and volume in an efficient manner and eliminates the formation of large droplets which are undesirable in a corrosive mist for testing equipment.

The annular air inlet surrounding the bottom of the tube, which can be easily adjusted to vary the amount and particle size of the mist produced by the device forms a cylindrical column of air on the inner surface of the tube 20 near the bottom of the tube which greatly assists in forming a mist of uniform density. The wall 26 surrounding the aspirator nozzle also assists in controlling the direction and characteristics of the aspirated fluid introduced into the bottom of the tube 20 so that the deflector 38 functions in the most efficient manner.

The mist generator 7 may be adjusted to function effectively when producing different particle size and amounts of mist because of the ability to adjust the size of the air opening while simultaneously adjusting the vertical position of the deflector 38.

The upper end of the tube 20 is constructed to minimize condensation of the mist as it is discharged from the top of the tube, the bar 43 preferably having a length at least 4 times its maximum width and preferably being shaped to minimize air resistance while at the same time assisting in diverting the mist laterally out of the tube over the curved surfaces 49 of the end thereof. This novel tube construction minimizes condensation at the top of the tube and enables the mist to be directed somewhat horizontally in the test cabinet, without undesirable condensation, which could effect the uniform consistency of the mist.

It will be understood that the above description is by way of illustration rather than limitation and that, in accordance with the provisions of the patent laws, variations and modifications of the specific devices disclosed herein may be made without departing from the spirit of the invention.

Having described my invention, I claim:

1. In a corrosion testing device comprising an enclosure that is resistant to attack by a corrosive test fluid, a corrosion-resistant mist generating unit having a tubular member open at its opposite ends, the internal surface of said tube being unobstructed, a plurality of widely spaced narrow legs carried by said tube to support it in an upright position, means including an upwardly directed aspirator nozzle below said tube for producing a corrosive mist, said nozzle being located at the central axis of said tube, means within said tube for causing air turbulence to produce a mist of uniform consistency comprising a tapered deflector of round cross sections mounted in said tube out of contact with said tube, said deflector increasing in diameter from its lower end and having a maximum diameter about one-third to about two-thirds the internal diameter of said tube, and a narrow rod extending within and carried by said tube for supporting said deflector at the axis of said tube.

2. In a corrosion testing cabinet, a mist generating unit of corrosion-resistant synthetic resin material having a round upright open-ended tube supported on a series of widely spaced narrow legs with a height several times the diameter of said tube and rigidly connected to the lower portion of said tube, means forming a liquid trap below said tube including a tubular wall substantially coaxial with said tube and spaced therefrom to define an annular air opening at the bottom of said tube, means mounting said tubular wall in a series of axially adjusted positions on the upper portions of said legs to vary the size of said annular air opening, and means below said trap for producing a corrosive mist including an upwardly directed aspirator nozzle at the axis of said tube and within said tubular wall.

3. In a corrosion testing cabinet having walls formed of a corrosion-resistant synthetic resin material, a mist generating unit formed of a corrosion-resistant synthetic resin material and having a vertically elongated open-ended cylindrical tube supported in a vertical position by a plurality of widely spaced narrow legs having bottom surfaces spaced from said tube, means forming a liquid trap below said tube including a cylindrical wall coaxial with said tube and spaced therefrom to define an annular air opening at the bottom of said tube and means mounting said cylindrical wall in a series of axially adjusted positions near the upper portions of said legs to vary the size of said annular air opening, means below said trap means for producing a corrosive mist including an upwardly directed aspirator nozzle at the axis of said tube near the center of said cylindrical wall, means for causing all turbulence in said tube comprising a tapered vertically elongated deflector having a generally conical lower surface and a narrow rod carried by said tube for supporting said deflector at the axis of said tube higher than the bottom surface of said tube including means for supporting said rod in a series of adjusted positions to vary the distance from said deflector to said bottom surface.

4. In a corrosion testing cabinet, a mist generating unit formed of a corrosion-resistant non-metallic material and having an internal tube of said material, a plurality of narrow legs rigidly connected to said tube to support it in a vertical position, a cup-shaped trap below said tube, an aspirator nozzle mounted below the bottom wall portion of said trap with its discharge opening at the axis of said tube below said tube, said trap having a tubular wall of small diameter surrounding said nozzle, a tubular outer wall of large diameter spaced from said tube to provide an annular air inlet opening, and a bottom wall spaced from the bottoms of said legs, a tapered deflector mounted at the axis of said tube above the bottom of said tube, said deflector increasing in diameter from its bottom surface, and adjustable means mounting said deflector within said tube, the inner surface of said tube being substantially uninterrupted throughout its length.

5. In a corrosion testing cabinet, a mist generating unit comprising a vertical tube of corrosion-resistant synthetic resin material, said tube being open at its opposite ends, means for supporting said tube including a series of widely spaced narrow legs having a length several times said diameter, an upwardly directed aspirator nozzle below said tube, trap means between said tube and nozzle for supporting said nozzle at the axis of said tube including a cylindrical wall spaced from and coaxial with said tube, a generally conical deflector at the axis of said tube and located above the bottom of said tube out of contact with the walls of said tube to create turbulence in said tube, a vertical rod at the axis of said tube extending upwardly from said deflector to support the same, and adjustable means at the top of said tube for adjusting the vertical position of said rod.

6. A mist generating unit comprising a cylindrical tube open at its opposite ends, a series of widely spaced narrow legs supporting said tube in a vertical position, an annular liquid trap mounted on said legs below said tube and having an annular wall concentric to said tube and spaced therefrom to provide an annular air passage leading to the bottom of said tube, means for creating turbulence in said tube comprising a round tapered deflector positioned above the bottom of said tube and a vertical rod supporting said deflector on said tube coaxial with and out of contact with said tube, said deflector gradually increasing in diameter from its lower end, an upwardly directed aspirator nozzle supported below said trap in line with said deflector to direct a corrosive mist toward said deflector, and means for adjusting the size of said air passage.

7. A mist generating unit as defined in claim 6 wherein said tube is formed of a synthetic resin material and has diametrically opposed upwardly projecting portions and a narrow horizontal bar extending between said portions to support said rod, the portions of said tube between said projecting portions being removed to facilitate flow of the corrosive mist transverse to the axis of said tube.

8. A mist generating unit as defined in claim 6 wherein adjustable supporting means are mounted on the top portion of said tube to support said rod and wherein said liquid trap has a cylindrical inner wall concentric to said annular wall and surrounding the flow from said aspirator nozzle, an annular bottom wall integrally joining said inner wall and said annular wall, and means for adjustably mounting said trap on said legs to vary the amount of air entering said tube.

9. In a corrosion testing device having a housing formed of a non-metallic material which is resistant to attack by a corrosive test fluid, a corrosion-resistant mist generating unit comprising a tube of synthetic resin material open at its opposite ends, a series of narrow upright legs connected to said tube and supporting the tube in an upright position, adjustable tapered deflecting means within said tube above the bottom surface thereof for causing turbulence in the tube, an annular trap below said tube having an inner cylindrical wall with an internal diameter about 0.2 to about 0.4 times the internal diameter of said tube and having a concentric outer cylindrical wall with an internal diameter about 1.1 to 1.4 times the internal diameter of said tube, means for supporting said trap on said legs in a series of adjusted vertical positions substantially coaxial with said tube, and means for creating a corrosive mist in said unit including an aspirator nozzle mounted below the bottom of said trap for directing the mist upwardly at the center of said inner cylindrical wall toward said deflecting means.

10. A mist generating device comprising a vertically elongated tube of corrosion-resistant material, a generally conical deflector mounted in said tube out of contact with the inner walls of the tube, means for supporting said deflector in a series of positions adjusted axially of said tube, an annular liquid trap mounted below said tube and spaced therefrom to define an annular air opening, and a central aspirator nozzle for creating a corrosive mist and directing it upwardly toward said deflector from the central part of said trap.

References Cited by the Examiner

UNITED STATES PATENTS

| 1,042,556 | 10/1912 | Holland et al. | 239—338 |
| 2,826,454 | 3/1958 | Coanda | 239—338 |
| 2,906,463 | 9/1959 | Curry | 239—338 |

FOREIGN PATENTS

| 1,322,998 | 2/1963 | France. |
| 767,628 | 2/1957 | Great Britain. |

EVERETT W. KIRBY, *Primary Examiner.*